(51.)

ERASTUS T. BUSSELL.

Ditching Machines.

No. 121,846.  Patented Dec. 12, 1871.

Witnesses:
A. Ruppert.
Joseph Forrest

Inventor:
Erastus T. Bussell,
By Theodore Munger,
Attorney.

UNITED STATES PATENT OFFICE.

ERASTUS T. BUSSELL, OF INDIANAPOLIS, INDIANA.

IMPROVEMENT IN DITCHING-MACHINES.

Specification forming part of Letters Patent No. 121,846, dated December 12, 1871.

*To all whom it may concern:*

Be it known that I, ERASTUS T. BUSSELL, of Indianapolis, in the county of Marion and State of Indiana, have invented certain new and useful Improvements in Ditching-Machines; and I hereby declare the following to be a full, clear, and exact description of the same, reference being had to the accompanying drawing making a part of this specification, in which—

Figure 1:
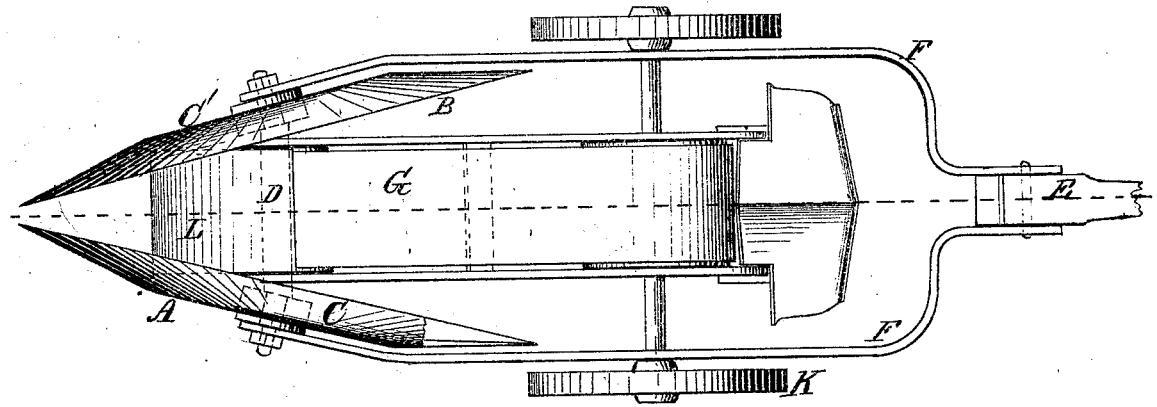
Figure 2:
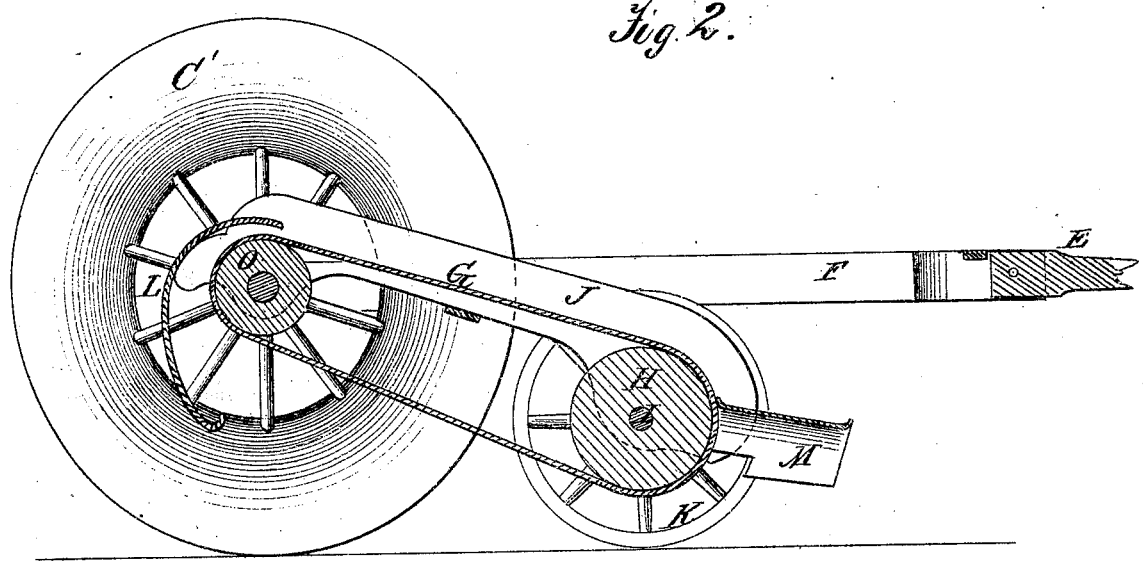

Figure 1 is a plan view of the machine, and Fig. 2 is a vertical longitudinal section through the line of draft.

This invention relates to an improvement in ditching-machines; and consists of two concavo-convex rim-disks, beveled from the inner to the outer periphery of their rims to form a cutting edge, having their concave sides facing each other, the right-hand disk right oblique, and the left-hand disk left oblique to the line of draft, which is a right line drawn from the center of the tongue, or the center of the front of the vibrating frame, to the vertex of an angle formed by continuing the converging lines of the disks until they meet in the rear of the machine; an endless apron, a scroll-shaped fender, a chute, and a double-incline for shedding the dirt, these latter supported by the axle of the disks and a wheeled axle in advance of the disks; the whole being arranged in such a manner that the revolving disks will enter the ground, compress the soil, and carry it up over the scroll-shaped fender, where the compression ceases and the soil falls upon the endless apron, by which it is carried down the inclined chute and deposited upon the dirt-shed, from whence it falls upon the ground upon either side of the ditch.

In the drawing, A is the right-hand disk, and B the left-hand disk, having the concavo-convex rims C and C', supported on the stationary axle D having its journals bent at an appropriate angle to permit the disks A and B to revolve obliquely to the line of draft. The disk A revolves right oblique to the line of draft, and the disk B left oblique to the line of draft, which is a right line drawn from the center of the tongue E, or the center of the front of the vibrating frame F, to the vertex of an angle formed by continuing the converging lines of the disks A and B at their extreme rear edges until they meet in the rear of the machine. The concave sides of the rims C C' face each other. The disks A and B counteract each other in front, as they enter the soil, causing the ditcher to maintain a straight line; and as they recede from the point of entrance coact to compress the soil and carry it up until the compression ceases and the soil falls upon the endless apron G. This apron G is carried by a cylinder, H, fixed to the revolving axle I, and a revolving cylinder, O, on the stationary axle D, and forms a movable bottom for the chute J, the motion being communicated by the revolutions of the wheels K fixed to the ends of the axle I. The chute J is supported by the axles D and I, and inclines gradually from the former to the latter. A scroll-shaped fender, L, secured to the rear end of the chute J, curves above the cylinder O to about its longitudinal center, and below it, about evenly with the inner peripheries of the rims C C'. A dirt-shed, M, composed of a double incline, is attached to the front of the chute J to receive the dirt from the endless apron G, and deposit it on the ground at either side of the ditch. The dirt-shed M may be arranged to throw the dirt all on one side of the ditch by hinging the double incline so that either side may be elevated. The vibrating frame F, to which the tongue E is attached, is secured to the square ends of the journals on the axle D, outside of the disks A and B, so that the power is applied to operate the machine at their journals.

When the machine is in operation the wheels K are driven along and revolve the cylinder H fixed to the axle I, thereby operating the endless apron G. When the soil has been compressed and is being carried up by the disks A and B, should a portion of it fall before reaching a point over the endless apron G it will be caught by the ascending soil between the disks A and B, and, if sufficient in quantity, will be pressed against the scroll-shaped fender L, and forced up into the chute J by the continuous revolution of the disks bringing up additional soil. Elevating the front of the vibrating frame F depresses the bent journals on the axle D and throws the peripheries of the disks A and B nearer to each other at the bottom, so that as the ditch deepens the bottom peripheries of the disks approach and the ditch gradually grows narrower at the bottom.

Having thus described my invention, what I claim as new and useful, and desire to secure by Letters Patent, is—

The concavo-convex rim-disks A and B, supported on the axle D in opposed positions, right oblique and left oblique to the line of draft, the concave sides of the rims C and C' facing each other, substantially as described, in combination with the chute J, scroll-shaped fender L, dirt-shed M, endless apron G, cylinders H and O, wheels K on the axle I, and the vibrating frame F, arranged relatively one to the other, for the uses and purposes hereinbefore set forth.

In witness that I claim the foregoing improvement in ditching-machines as above described I have hereunto set my hand and seal this 25th day of October, 1871.

ERASTUS T. BUSSELL. [L. S.]

Witnesses:
    JAMES F. JOYCE,
    W. H. KERN. (51)